United States Patent [19]

Arora et al.

[11] 4,279,715

[45] Jul. 21, 1981

[54] ETCHING OF ALUMINUM CAPACITOR FOIL

[75] Inventors: Mulk A. Arora; John J. Randall, Jr.; Walter J. Bernard, all of Williamstown, Mass.

[73] Assignee: Sprague Electric Company, North Adams, Mass.

[21] Appl. No.: 187,271

[22] Filed: Sep. 15, 1980

[51] Int. Cl.³ ............................ C25F 3/04; C25F 3/14
[52] U.S. Cl. ............................. 204/129.9; 204/129.4; 204/129.95
[58] Field of Search .............. 204/129.9, 129.95, 129.4

[56] References Cited

U.S. PATENT DOCUMENTS

| | | | |
|---|---|---|---|
| 3,477,929 | 11/1969 | Namikata et al. | 204/129.95 |
| 3,663,441 | 5/1972 | Gulla | 252/79.4 |
| 3,887,447 | 6/1975 | Sheasby et al. | 204/129.4 |
| 4,140,599 | 2/1979 | Yamasaki et al. | 204/129.43 |

Primary Examiner—T. M. Tufariello
Attorney, Agent, or Firm—Connolly and Hutz

[57] ABSTRACT

Aluminum electrolytic capacitor foil is etched in a bath containing 1.0 to 1.8 M hydrochloric acid, 0.25 to 0.5 M aluminum chloride, 0.2 to 1.0 M phosphoric acid, and 1.0 to 2.0 M chromium trioxide while subjected to the action of alternating current at 35° to 55° C.

7 Claims, 1 Drawing Figure

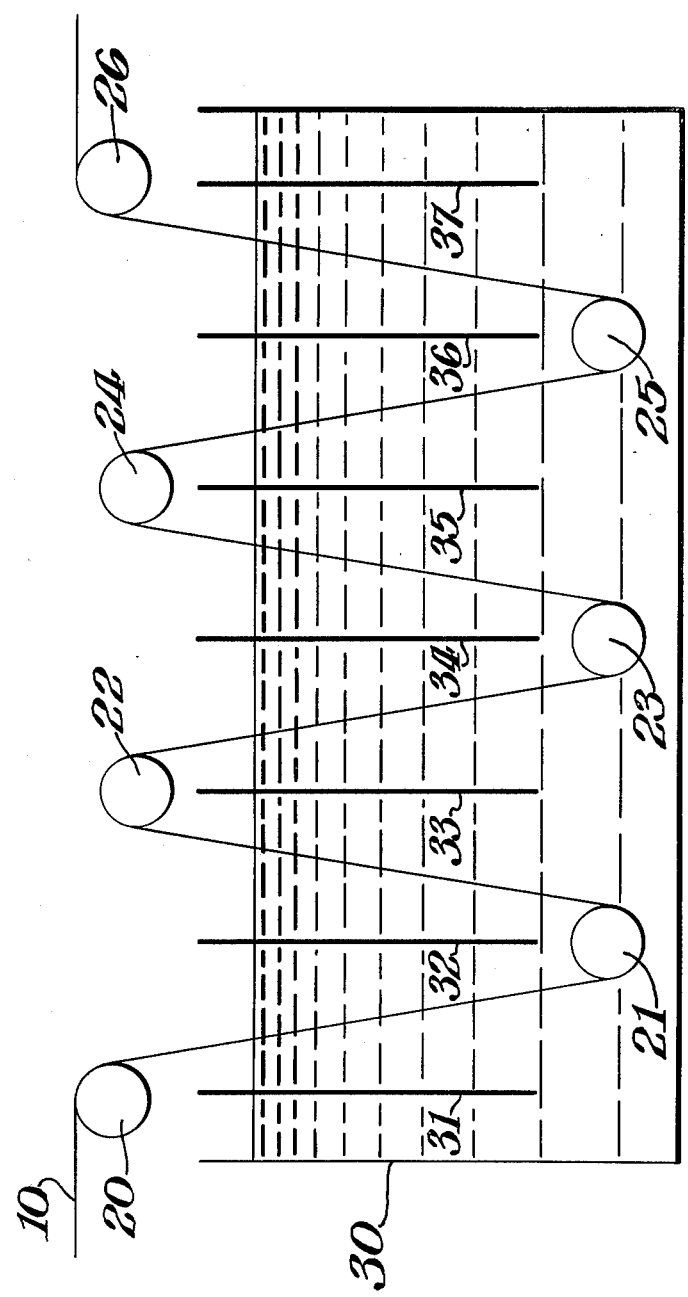

ETCHING OF ALUMINUM CAPACITOR FOIL

BACKGROUND OF THE INVENTION

This invention relates to the etching of aluminum foil for electrolytic capacitors, and in particular to a process utilizing alternating current and a chloride etchant bath containing phosphate and chromate ions.

AC etching of aluminum for lithographic plates, electrolytic capacitors, and other articles is known. Similarly, chloride etchants containing chromate and phosphate for use with DC current are known. The latter have produced porous anode elements.

A copending application filed on even date with this application teaches the advantages of using a phosphate in the etchant solution.

SUMMARY OF THE INVENTION

It has been found that it is possible to produce a non-porous etched foil, i.e., foil that is etched on both sides, but with a solid metal core, using AC current and a chloride etchant solution containing phosphate and chromate.

The presence of the metal core improves the mechanical properties of the etched foil so that thinner foil can be processed for the same weight loss or a greater weight loss is possible for the same foil thickness thus giving higher capacitance in the latter case.

The present application is based on the discovery that, in an AC etch process, phosphate plus chromate ions act synergistically within the concentrations of 0.2 to 1.0 M phosphate and 1.0 to 2.0 M chromate to increase the etch density (number of pits per unit area) more than either phosphate or chromate alone, leading to higher capacitance. Above 1.0 M phosphate and/or above 2.0 M chromate, the capacitance starts to decrease. Below 0.2 M phosphate and/or 1.0 M chromium, the synergism is upset also. The etchant solution preferably contains 1.0 to 1.8 M hydrochloric acid to provide chloride ion and hydronium ion for etching. Concentrations above 1.8 M HCl upset the above synergistic effect, and below 1.0 M not enough etching.

Aluminum chloride is also present in the etchant to stabilize the solution as is well-known in the art. Its concentration is preferably 0.25 to 0.5 M with the lower limit being the lowest that is cost-effective from a production standpoint and the upper limit that above which capacitance starts to decrease.

Optimum concentrations for the etchant consituents are 1.4 M hydrochloric acid, 0.4 M aluminum chloride, 0.7 M phosphoric acid, and 1.4 M chromium trioxide.

The process is carried out at 35° to 55° C., a lower temperature than the prior art processes prefer. Higher temperatures with the above etchant led to a smoothing or polishing of the foil. The frequency of the alternating current is 30 to 60 Hz as this range gave the highest capacitance as will be shown below. The anodic current density is 2.0 to 3.5 A/in$^2$ as 2.0 A/in$^2$ is the lowest current density that will provide the number of etch sites desired and above 3.5 A/in$^2$ foil thinning starts to take place. The voltage at the above current density and the etching machine described was ±7 V. However, if a different machine design is used, the voltage will differ also.

The above combination of process variables and etchant solution concentrations also gave the least amount of foil thinning resulting in a mechanically strong foil.

BRIEF DESCRIPTION OF THE DRAWING

The sole FIGURE depicts foil being etched by the process of the present invention.

DESCRIPTION OF THE PREFERRED EMBODIMENTS

Aluminum foil 10 is passed via roller 20 into etchant bath 30 between electrodes 31 and 32 connected to an AC source (not shown). Foil 10 passes under roll 21 and up between electrodes 32 and 33, over roll 22, between electrodes 33 and 34, under roll 23, between electrodes 34 and 35, over roll 24, between electrodes 35 and 36, under roll 25, between electrodes 36 and 37 and finally over roll 26. While the design shown utilizes seven electrodes for three complete etching passes in the etchant bath 30, more electrodes or other arrangements may be used.

Etchant bath 30 contains 1.0 to 1.8 M hydrochloric acid, 0.25 to 0.5 M aluminum trichloride, 0.2 to 1.0 M phosphoric acid, and 1.0 to 1.8 M chromium trioxide. In the following examples, the effect of etchant consituent concentrations and process variable will be shown.

In all the examples, 2.9 mil thick soft aluminum foil of 99.99% purity was used. However, it is within the scope of the invention to use other purity foil. Since soft foil gave the capacitances shown below, it was unnecessary to use hard foil, although it can be etched by the process of the present invention, to get the desired results.

EXAMPLE 1

In this example a solution of 1.4 M hydrochloric acid, 0.4 M aluminum chloride, 0.2 M phosphoric acid, and 1.0 M chromium trioxide was used as etchant. The temperature was 45° C., frequency was 25 Hz, and current density was 2.8 A/in$^2$. Thickness refers to thickness in mils after etching. Etch time is in minutes, and capacitance per unit area, (Cap), is in microfarads per square inch, $\mu F/in^2$.

TABLE 1

| Sample | Time | Wt-loss. % | Thickness | 10V Cap | 30V Cap |
|---|---|---|---|---|---|
| 1 | 1.5 | 16.6 | 2.8 | 155.9 | 36.3 |
| 2 | 1.8 | 19.6 | 2.7 | 175.3 | 40.2 |
| 3 | 2.0 | 21.4 | 2.8 | 169.7 | 43.2 |
| 4 | 3.3 | 34.3 | 2.7 | 345.0 | 80.4 |

EXAMPLE 2

In this example, the effect of varying frequency is shown. Etchant solution is 1.4 M hydrochloric acid, 0.4 M aluminum chloride, 0.7 M phosphoric acid, and 1.4 M chromium trioxide. The temperature is 45° C., and current density 2.8 A/in$^2$. The units are as given in Example 1.

TABLE 2

| Sample | Freq.,Hz | Thickness | Wt-loss, % | 10V Cap | 30V Cap |
|---|---|---|---|---|---|
| 1 | 2.5 | 1.9 | 70.6 | 174.5 | 44.9 |
| 2 | 5.0 | 2.0 | 66.2 | 200.7 | 53.9 |
| 3 | 10.0 | 2.2 | 51.8 | 120.7 | 33.0 |
| 4 | 20.0 | 2.7 | 40.5 | 229.5 | 59.8 |
| 5 | 25.0 | 2.7 | 40.4 | 390.3 | 99.6 |
| 6 | 30.0 | 2.8 | 39.3 | 427.6 | 114.5 |
| 7 | 40.0 | 2.8 | 34.4 | 445.1 | 132.2 |
| 8 | 50.0 | 2.9 | 32.5 | 460.4 | 139.7 |
| 9 | 60.0 | 2.9 | 30.7 | 396.4 | 141.1 |

It will be seen from the above results that as frequency increases, capacitance does also up to about 60 Hz. It was found that optimum frequency is 50 to 60 Hz.

EXAMPLE 3

Average results are presented below for runs using an etch solution containing 1.4 M hydrochloric acid, 0.4 M aluminum tri-chloride, 1.0 M phosphoric acid, and 1.0 M chromium trioxide at 45° C., 25 Hz, and 2.8 A/in$^2$ current density.

TABLE 3

| Thickness | Wt-loss, % | 10V Cap | 30V Cap |
|---|---|---|---|
| 2.75 mil | 39.2 | 324 | 90.8 |

EXAMPLE 4

In this example, an etch solution containing 1.4 M hydrochloric acid, 0.4 M aluminum trichloride, 0.8 M phosphoric acid, and 2 M chromium trioxide was used. Conditions were 45° C., 25 Hz, 2.8 A/in$^2$ and a 3.0 min etch time.

TABLE 4

| Thickness | Wt-loss, % | 10V Cap | 30V Cap |
|---|---|---|---|
| 2.6 mil | 36.6 | 358 | 98.3 |

EXAMPLE 5

In this example, the etch solution contained 1.8 M hydrochloric acid, 0.6 M aluminum trichloride, 1.2 M phosphoric acid, and 1.6 M chromium trioxide. Foil was etched for 3.3 min at 45° C., 25 Hz, and 2.8 A/in$^2$. As will be seen from the results, phosphoric acid concentration above 1.0 M acts to inhibit etching rather than promoting it, and an aluminum chloride concentration as high as 0.6 M also has a detrimental effect on capacitance.

TABLE 5

| Thickness | Wt-loss, % | 10V Cap | 30V Cap |
|---|---|---|---|
| 2.85 mil | 20.2 | 73 | 19.4 |

EXAMPLE 6

The effect of temperature is shown in this example. The etch solution contained 1.4 M hydrochloric acid, 0.4 M aluminum trichloride, 0.7 M phosphoric acid and 1.4 M chromium trioxide. Etching was carried out at 60 Hz, 2.8 A/in$^2$, and for 3.65 min.

TABLE 6

| Temperature | Thickness | Wt-loss, % | 10V Cap | 30V Cap |
|---|---|---|---|---|
| 35° C. | 2.9 mil | 31 | 462 | 139 |
| 55° C. | 2.8 mil | 37 | 365 | 91 |

At the lower temperature, there was little if any change in thickness although there was a weight loss. Capacitance was higher also.

EXAMPLE 7

This example shows the effect of current density and time. The etch solution was that of Example 6, and etching was carried out at 45° C. and 50 Hz.

TABLE 7

| Current density | Time | Thickness | Wt-loss, % | 10V Cap | 30V Cap |
|---|---|---|---|---|---|
| 2.0 A/in$^2$ | 4.67 min | 2.9 mil | 34.4 | 323 | 94.1 |
| 3.5 A/in$^2$ | 2.67 min | 2.85 mil | 33.2 | 425 | 121 |

EXAMPLE 8

In this example, results are presented from the use of an etch solution containing 1.0 M hydrochloric acid, 0.25 M aluminum trichloride, 0.7 M phosphoric acid, and 1.4 M chromium trioxide. Etching was carried out at 45° C. and 2.8 A/in$^2$ for 3.3 min at three different frequencies.

TABLE 8

| Frequency | Thickness | Wt-loss, % | 10V Cap | 30V Cap |
|---|---|---|---|---|
| 20 Hz | 2.73 mil | 47.6 | 356 | 102.8 |
| 25 | 2.78 | 41.7 | 337 | 88.0 |
| 30 | 2.73 | 42.7 | 318 | 86.9 |

The broad range of conditions that are preferable are 2.0 to 3.5 A/in$^2$ current density, 30 to 60 Hz, and 35° to 55° C. with an etchant solution that is 1.0 to 1.8 M hydrochloric acid, 0.25 to 0.5 M aluminum trichloride, 0.2 to 1.0 M phosphoric acid, and 1.0 to 2.0 M chromium trioxide.

What is claimed is:

1. A process for etching aluminum electrolytic capacitor foil comprising electrolytically etching said foil using alternating current in a bath containing 1.0 to 1.8 M hydrochloric acid, 0.25 to 0.5 M hydrated aluminum trichloride, 0.2 to 1.0 M phosphoric acid, and 1.0 to 2.0 M chromium trioxide.

2. A process according to claim 1 wherein the temperature of said bath is 35° to 55° C.

3. A process according to claim 2 wherein said temperature is 45° C.

4. A process according to claim 1 wherein the anodic current density is 2.0 to 3.5 amps/in$^2$.

5. A process according to claim 1 wherein said bath contains 1.4 M hydrochloric acid, 0.4 M aluminum trichloride, 0.7 M phosphoric acid, and 1.4 M chromium trioxide.

6. A process according to claim 1 wherein the frequency of said alternating current is 30 to 60 Hz.

7. A process according to claim 6 wherein said frequency is 50 to 60 Hz.

* * * * *